May 16, 1933.  S. BAADER  1,909,799
DRILL CHUCK
Filed June 13, 1932
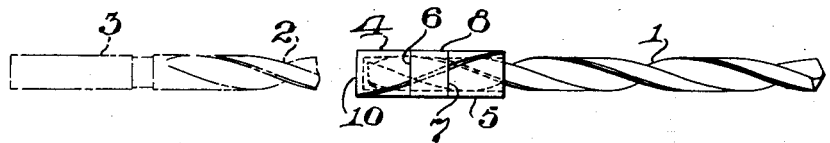
Fig. 2.   Fig. 1.
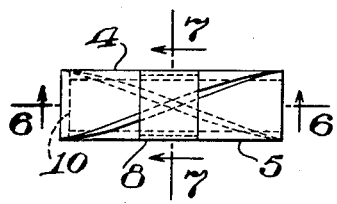 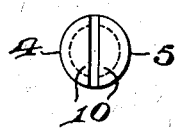
Fig. 3.   Fig. 4.   Fig. 5.
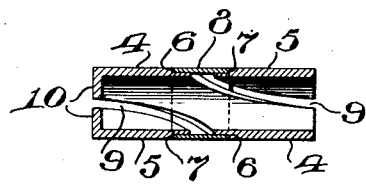 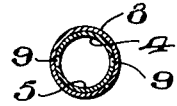
Fig. 6.   Fig. 7.
INVENTOR
Stephan Baader,
BY
J. Stuart Freeman,
ATTORNEY Patented May 16, 1933

1,909,799

UNITED STATES PATENT OFFICE

STEPHAN BAADER, OF PHILADELPHIA, PENNSYLVANIA

DRILL CHUCK

Application filed June 13, 1932. Serial No. 616,875.

The object of this invention is to provide improvements in chucks for various purposes, but more especially in that type which is particularly adapted for use in holding a broken or dulled drill, while it is being resharpened.

Another object, more specifically, is to provide a chuck which is adapted to receive and positively hold that portion of a drill which is characterized by the usual spiral grooves, that make it so difficult if not impossible to hold this portion of a drill in the well-known so-called universal chucks, or even those types which are provided with independently adjustable jaws.

A further object therefore is to provide a chuck of this improved type, which is most simple in construction and operation, comprising if desired but two clamping sections, adapted to receive and grip any portion of the usual machine drill or similar rod, bar, or the like, and means to normally secure such sections together.

With the objects thus broadly stated, the present invention comprises further details of construction and operation, which are fully brought out in the following description, when read in conjunction with the accompanying drawing, in which Fig. 1 is a side elevation of one embodiment of the invention, showing the chuck operatively holding a drill which has been sharpened; Fig. 2 is a dot-and-dash representation of a broken drill, which has a smooth chuck-engaging portion in contrast with the spirally grooved overall length of the drill shown in Fig. 1; Fig. 3 is an enlarged side elevation of the improved chuck; Figs. 4 and 5 are respectively right and left end elevations of the chuck as shown in Fig. 3; Fig. 6 is a section on the line 6—6 of Fig. 3; and Fig. 7 is a section on the line 7—7 of Fig. 3.

Referring to the drawing, a drill may comprise either the continuously grooved shank 1 of Fig. 1, or the grooved shank 2 and relatively smooth supporting or chuck-engaging end portion 3 of Fig. 2. The improved chuck primarily comprises two similar sections 4 and 5, which are complementary of each other and are provided exteriorly with aligned semi-circumferential grooves 6 and 7, in which is slidably positioned a preferably cylindrical metal band or ferrule 8, which serves to yieldingly and loosely maintain said sections in operative relation.

The sections 4 and 5 can best be described by stating that they may be formed from a hollow cylindrical member having one closed end, the opposite sides and the end of such member then being cut or milled so as to produce the chuck as illustrated in the drawing. However, it is obvious that if preferred the chuck sections can be made separately as by casting or otherwise, and then assembled to form the complete device.

In either case, said sections are spiral in shape, being separated by slots 9, while they are inturned at one end to form slightly spaced complementary flanges 10, lying in a common plane and forming a stop to limit the movement of a drill in one direction therethrough, although it is to be understood that for the operation of the chuck sections in performing their characteristic functions, no closure for either end is necessary. Instead, this closure of one end merely aids in aligning the two sections as they are quickly slipped upon the opposite sides of a drill, and come into simultaneous contact with the end of the drill, or with a stop within the larger chuck by which they may be held as a unit in a given machine.

From this construction, it will be obvious that there is a slight play and radial looseness between the chuck sections, which may be increased if desired so as to adapt one size chuck to several sizes of drills. Furthermore, it is equally obvious that after the chuck has been slipped upon the end portion of any form drill to which it is adapted, said chuck may be readily inserted within and gripped by any known form of holding devices such as are provided for operatively securing a drill in a lathe, drill press, sharpener, or other type of machine. It is also to be understood that this improved chuck can equally well be used to grip various other articles, such as pins, rods, screws, bolts, and the like, which are characterized by either regular or irregular gripping surfaces, since the spiral form of the sections spans all grooves, recesses, and many other forms of surface irregularities, which would otherwise be at least partially entered by one or more of the jaws of the usual types of chuck, and thus permitting the article gripped thereby to assume other than the desired position or direction in the machine.

Having thus described my invention what I claim and desire to protect by Letters Patent of the United States is:—

1. A chuck, comprising a plurality of spirally shaped sections, so assembled as to form a substantial cylinder into which an article to be gripped may be inserted, a projection carried by one end of each of said sections, to close that end of said chuck sufficiently to limit the movement of an article therethrough, and a band loosely surrounding and operative to maintain said sections in operative assembly.

2. A chuck, comprising a plurality of spirally shaped sections having complementary inner surfaces adapted to engage articles of variously shaped surfaces, the outer surfaces of said sections being provided with aligned grooves, and means positioned by said grooves to maintain said sections in operative assembly.

In testimony whereof I have affixed my signature.

STEPHAN BAADER.